(12) United States Patent
Qi

(10) Patent No.: US 11,115,932 B2
(45) Date of Patent: Sep. 7, 2021

(54) REFERENCE SIGNAL POWER BOOSTING IN A TELECOMMUNICATION SYSTEM

(71) Applicant: Samsung Electronics Co., Ltd., Suwon-si (KR)

(72) Inventor: Yinan Qi, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/278,597

(22) Filed: Feb. 18, 2019

(65) Prior Publication Data

US 2019/0261279 A1 Aug. 22, 2019

(30) Foreign Application Priority Data

Feb. 16, 2018 (GB) ..................................... 1802576

(51) Int. Cl.
| | |
|---|---|
| *H04W 52/14* | (2009.01) |
| *H04W 52/54* | (2009.01) |
| *H04W 52/16* | (2009.01) |
| *H04W 52/04* | (2009.01) |
| *H04W 52/18* | (2009.01) |
| *H04W 52/34* | (2009.01) |
| *H04W 52/32* | (2009.01) |
| *H04L 5/00* | (2006.01) |

(Continued)

(52) U.S. Cl.
CPC ......... *H04W 52/146* (2013.01); *H04L 5/0048* (2013.01); *H04W 76/27* (2018.02)

(58) Field of Classification Search
None
See application file for complete search history.

(56) References Cited

U.S. PATENT DOCUMENTS

| | | | | |
|---|---|---|---|---|
| 2018/0359069 A1* | 12/2018 | Nam | .................... | H04L 5/0048 |
| 2019/0182001 A1* | 6/2019 | Lee | ................... | H04B 7/0478 |
| 2020/0205082 A1* | 6/2020 | Chen | ................... | H04W 72/042 |

FOREIGN PATENT DOCUMENTS

| | | | | |
|---|---|---|---|---|
| CN | 108811066 A | * 11/2018 | .......... | H04W 52/325 |
| WO | 2017200315 A1 | 11/2017 | | |
| WO | WO-2018088816 A1 | * 5/2018 | ........... | H04L 5/0053 |

OTHER PUBLICATIONS

ISA/KR, International Search Report and Written Opinion of the International Searching Authority, Application No. PCT/KR2019/001923, dated May 27, 2019, 8 pages.

(Continued)

*Primary Examiner* — Mohammed Rachedine

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Disclosed is a method of boosting power of a phase tracking reference signal, PTRS, in a telecommunication system, wherein PTRS is used in an uplink transmission and two PTRS ports are configured and whereby the power boosting is defined based on relationship of the power to a number of PUSCH layers.

19 Claims, 15 Drawing Sheets

| A [dB] | # PDSCH layers in DMRS group | | | | | |
|---|---|---|---|---|---|---|
| | 1 | 2 | 3 | 4 | 5 | 6 |
| RRC parameter 00 | 0 | 3 | 4.77 | 6 | 7 | 7.78 |
| RRC parameter 01 | 0 | 0 | 0 | 0 | 0 | 0 |
| RRC parameter 10 | Reserved | | | | | |
| RRC parameter 11 | Reserved | | | | | |

(51) Int. Cl.
  *H04B 7/0404* (2017.01)
  *H04W 76/27* (2018.01)

(56) References Cited

OTHER PUBLICATIONS

Intel Corporation, "Remaining Issues on PT-RS," R1-1800317, 3GPP TSG RAN WG1 Meeting AH 1801, Vancouver, Canada, Jan. 22-26, 2018, 9 pages.
LG Electronics, "Text proposals on UL PT-RS power boosting and DL PT-RS reception," R1-1800369, 3GPP TSG RAN WG1 Meeting AH 1801, Vancouver, Canada, Jan. 22-26, 2018, 8 pages.
Nokia, et al., "On remaining details of PT-RS design," R1-1800757, 3GPP TSG RAN WG1 Meeting AH 1801, Vancouver, Canada, Jan. 22-26, 2018, 7 pages.
Vivo, "Remaining issues on PT-RS," R1-1801526, 3GPP TSG RAN WG1 Meeting #92, Athens, Greece, Feb. 26-Mar. 2, 2018, 8 pages.
Ericsson, "Thursday evening summary of PTRS", 3GPP TSG RAN WG1 Meeting #91, Nov. 27-Dec. 1, 2017, R1-1721637, 9 pages.
Nokia et al., "On remaining details on PT-RS design", 3GPP TSG RAN WG1 #91, Nov. 27-Dec. 1, 2017, R1-1720896, 5 pages.
Combined Search and Examination Report under Sections 17 & 18(3) dated Jul. 19, 2019 in connection with United Kingdom Patent Application No. GB1902044.5, 4 pages.
Supplementary European Search Report dated Dec. 3, 2020 in connection with European Application No. 19754161.8, 12 pages.
3GPP TS 38.211 V15.0.0 (Dec. 2017), Technical Specification, 3rd Generation Partnership Project; Technical Specification Group Radio Access Network; NR; Physical channels and modulation (Release 15), Dec. 2017, 73 pages.
3GPP TS 38.212 V15.0.1 (Feb. 2018), Technical Specification, 3rd Generation Partnership Project; Technical Specification Group Radio Access Network; NR; Multiplexing and channel coding (Release 15), Feb. 2018, 88 pages.
3GPP TS 38.214 V15.0.0 (Feb. 2018), Technical Specification, 3rd Generation Partnership Project; Technical Specification Group Radio Access Network; NR; Physical layer procedures for data (Release 15), Feb. 2018, 76 pages.
Rapporteur (Ericsson), "Corrections on EN-DC," R2-180xxxx, 3GPP TSG-RAN WG2 Meeting #101, Athens, Greece, Feb. 26-Mar. 2, 2018, 270 pages.

* cited by examiner

FIG. 1

| A [dB] | | # PDSCH layers in DMRS group | | | | | |
|---|---|---|---|---|---|---|---|
| | | 1 | 2 | 3 | 4 | 5 | 6 |
| RRC parameter | 00 | 0 | 3 | 4.77 | 6 | 7 | 7.78 |
| | 01 | 0 | 0 | 0 | 0 | 0 | 0 |
| | 10 | Reserved | | | | | |
| | 11 | Reserved | | | | | |

FIG. 2

| PDSCH-to-PT-RS EPRE ratio | The number of PDSCH layers within the DMRS port group containing DMRS port associated with the PT-RS port i, ($n_{DMRS}^{PRTS,i}$) | | | | | |
|---|---|---|---|---|---|---|
| | 1 | 2 | 3 | 4 | 5 | 6 |
| 00 | 0 | 3 | 4.77 | 6 | 7 | 7.78 |
| 01 | 0 | 0 | 0 | 0 | 0 | 0 |
| 10 | reserved | | | | | |
| 11 | reserved | | | | | |

FIG. 7

| PDSCH-to-PT-RS EPRE ratio | The number of PDSCH layers not within the DMRS port group containing DMRS port associated with the PT-RS port i, ($n_{DMRS}^{PRTS,i}$) | | | | | |
|---|---|---|---|---|---|---|
| | 1 | 2 | 3 | 4 | 5 | 6 |
| 00 | 0 | 3 | 4.77 | 6 | 7 | 7.78 |
| 01 | 0 | 0 | 0 | 0 | 0 | 0 |
| 10 | reserved | | | | | |
| 11 | reserved | | | | | |

FIG. 8

| PDSCH-to-PT-RS EPRE ratio | The number of PDSCH layers within the DMRS port group containing DMRS port associated with the PT-RS port i, ($n_{DMRS}^{PRTS,i}$) | | | | | |
|---|---|---|---|---|---|---|
| | 1 | 2 | 3 | 4 | 5 | 6 |
| 00 | 0 | 3 | 4.77 | 6 | 7 | 7.78 |
| 01 | 0 | 0 | 0 | 0 | 0 | 0 |
| 10 | Values from 00+10log10(m) | | | | | |
| 11 | reserved | | | | | |

FIG. 9 m=1

| PDSCH-to-PT-RS EPRE ratio | The number of PDSCH layers not within the DMRS port group containing DMRS port associated with the PT-RS port i, ($n_{DMRS}^{PRTS,i}$) | | | | | |
|---|---|---|---|---|---|---|
| | 1 | 2 | 3 | 4 | 5 | 6 |
| 00 | 3 | 4.77 | 6 | 7 | 7.78 | 8.45 |
| 01 | 0 | 0 | 0 | 0 | 0 | 0 |
| 10 | reserved | | | | | |
| 11 | reserved | | | | | |

FIG. 10 m=2

| PDSCH-to-PT-RS EPRE ratio | The number of PDSCH layers within the DMRS port group containing DMRS port associated with the PT-RS port i, ($n_{DMRS}^{PRTS,i}$) | | | | | |
|---|---|---|---|---|---|---|
| | 1 | 2 | 3 | 4 | 5 | 6 |
| 00 | 4.77 | 6 | 7 | 7.78 | 8.45 | 9 |
| 01 | 0 | 0 | 0 | 0 | 0 | 0 |
| 10 | reserved | | | | | |
| 11 | reserved | | | | | |

FIG. 11 m=3

| PDSCH-to-PT-RS EPRE ratio | The number of PDSCH layers within the DMRS port group containing DMRS port associated with the PT-RS port i, ($n_{DMRS}^{PRTS,j}$) | | | | | |
|---|---|---|---|---|---|---|
| | 1 | 2 | 3 | 4 | 5 | 6 |
| 00 | 6 | 7 | 7.78 | 8.45 | 9 | 9.54 |
| 01 | 0 | 0 | 0 | 0 | 0 | 0 |
| 10 | reserved | | | | | |
| 11 | reserved | | | | | |

FIG. 12 m=4

| PDSCH-to-PT-RS EPRE ratio | The number of PDSCH layers within the DMRS port group containing DMRS port associated with the PT-RS port i, ($n_{DMRS}^{PRTS,j}$) | | | | | |
|---|---|---|---|---|---|---|
| | 1 | 2 | 3 | 4 | 5 | 6 |
| 00 | 7 | 7.78 | 8.45 | 9 | 9.54 | 10 |
| 01 | 0 | 0 | 0 | 0 | 0 | 0 |
| 10 | reserved | | | | | |
| 11 | reserved | | | | | |

FIG. 13 m=5

| PDSCH-to-PT-RS EPRE ratio | The number of PDSCH layers within the DMRS port group containing DMRS port associated with the PT-RS port i, ($n_{DMRS}^{PRTS,j}$) | | | | | |
|---|---|---|---|---|---|---|
| | 1 | 2 | 3 | 4 | 5 | 6 |
| 00 | 7.78 | 8.45 | 9 | 9.54 | 10 | 10.41 |
| 01 | 0 | 0 | 0 | 0 | 0 | 0 |
| 10 | reserved | | | | | |
| 11 | reserved | | | | | |

FIG. 14 m=6

| PDSCH-to-PT-RS EPRE ratio | The number of PDSCH layers within the DMRS port group containing DMRS port associated with the PT-RS port i, ($n_{DMRS}^{PRTS,j}$) | | | | | |
|---|---|---|---|---|---|---|
| | 1 | 2 | 3 | 4 | 5 | 6 |
| 00 | 8.45 | 9 | 9.54 | 10 | 10.41 | 10.79 |
| 01 | 0 | 0 | 0 | 0 | 0 | 0 |
| 10 | reserved | | | | | |
| 11 | reserved | | | | | |

FIG. 15

| A [dB] | | # PUSCH layers | | | |
|---|---|---|---|---|---|
| | | 1 | 2 | 3 | 4 |
| RRC parameter | 00 | 0 | 3 | 4.77 | 6 |
| | 01 | Reserved | | | |
| | 10 | Reserved | | | |
| | 11 | Reserved | | | |

REFERENCE SIGNAL POWER BOOSTING IN A TELECOMMUNICATION SYSTEM

CROSS REFERENCE TO RELATED APPLICATIONS

This application is based on and claims priority under 35 U.S.C. § 119 to United Kingdom Patent Application No. GB 1802576.7 filed on Feb. 16, 2018, in the United Kingdom Intellectual Property Office, the disclosure of which is incorporated by reference herein in its entirety.

BACKGROUND

1. Field

The present disclosure relates to power boosting a reference signal in a telecommunication system. It particularly, but not exclusively, applies to boosting a phase tracking reference signal (PTRS) in a $5^{th}$ generation or new radio (NR) system.

It has been agreed to facilitate power boosting of PTRS in the NR standardisation process. Details of the agreement are provided below.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

SUMMARY

A radio resource control (RRC) parameter is introduced to configure the PDSCH to PTRS energy per resource element (EPRE) ratio per PTRS port. The parameter has 2 bits and If PDSCH to PTRS EPRE ratio per PTRS port is not configured for the downlink, this parameter is set to a default value.

At least in the case of downlink (DL) single user, multiple input, multiple output (SU-MIMO) scheduling, the EPRE ratio between PTRS and PDSCH is by default implicitly indicated by the number of scheduled PTRS ports for the UE. The default EPRE ratio is 0 dB for 1 PTRS port case and 3 dB for 2 PTRS port case. Other combinations including EPRE up to 6 dB are allowed by RRC configuration of association between number of DL PTRS ports and EPRE ratios.

A DL PTRS port and the DL DMRS port(s) within the associated DL DMRS port group are quasi co-located (QCLed) with respect to delay spread, Doppler spread, Doppler shift, average delay and spatial Rx parameters.

If one DL PTRS port is transmitted for two scheduled DL DMRS port groups, the PTRS port and the DMRS port(s) which are not in the associated DMRS port group are QCLed with respect to Doppler spread, Doppler shift and, potentially, spatial QCL parameters.

The PDSCH to PTRS EPRE ratio per layer is equal to: $-10*\log 10(N_{PTRS})-A$ where the parameter A is given by the table shown at FIG. 1 using the RRC parameter: DL-PTRS-EPRE-ratio, with a default value of 00.

When the UE is scheduled with $N_{PTRS}$ PTRS ports in downlink and the PTRS port i is associated to $n_{DMRS}^{PTRS,i}$ DMRS ports, then if the UE is configured with the higher layer parameter epre-RATIO, the ratio of PDSCH EPRE to PTRS EPRE per layer per RE for PTRS port i ($\rho_{PTRS,i}$) is given by:

$$\rho_{PTRS,i} = -10 \log_{10}(N_{PTRS}) - \alpha_{PTRS,i} [dB]$$

where $\alpha_{PTRS,i}$ is as shown in the table in FIG. 2, according to the epre-RATIO.

The UE may assume epre-RATIO is set to state "00" in FIG. 2 if not configured.

Embodiments of the present disclosure aim to address issues connected with boosting a power of a reference signal, regardless of whether such issues are mentioned herein or not.

According to the present disclosure there is provided an apparatus and method as set forth. Other features of the disclosure will be apparent from the description which follows.

According to an aspect of the disclosure, there is provided a method of boosting the power of a reference signal, in a telecommunication system, across DMRS groups.

According to an aspect of the disclosure, there is provided a method of boosting the power of a reference signal, in a telecommunication system, across DMRS groups, wherein one reference signal port is shared by a plurality of DMRS groups, wherein the reference signal associated with one of the plurality of DMRS groups borrows power from one of the others of the plurality of DMRS groups.

In an embodiment, the reference signal is a reference signal associated with phase tracking.

In an embodiment, for uplink transmission, two reference signal ports are configured.

In an embodiment, the boosting power is limited on a per antenna or per port basis.

According to an aspect of the disclosure, there is provided a method of boosting power of a phase tracking reference signal, PTRS, in a telecommunication system, wherein PTRS is used in an uplink transmission and two PTRS ports are configured and whereby the power boosting is defined by the table 1 which relates the power to a number of PUSCH layers.

TABLE 1

Power Boosting

| | | # PUSCH layers | | | |
|---|---|---|---|---|---|
| A [dB] | | 1 | 2 | 3 | 4 |
| RRC parameter | 00 | 0 | 3 | 4.77 | 6 |
| | 01 | | Reserved | | |
| | 10 | | Reserved | | |
| | 11 | | Reserved | | |

According to an aspect of the disclosure, there is provided a method of boosting power for codebook and non-codebook based uplink transmissions in a telecommunication system, wherein a power constraint is defined and signalled for the uplink transmissions on a per antenna or per antenna port basis.

In an embodiment, a different power boosting scheme is applied depending upon whether the per antenna or per antenna port constraint is imposed upon a UE or a base station.

In an embodiment, if the constraint is imposed upon the UE, this is derived from a UE capability report.

In an embodiment, if the constraint is imposed upon the base station, this is indicated using DCI, MAC CE, RRC or other form of downlink signaling, explicitly.

According to an aspect of the disclosure, there is provided a non-transitory data carrier carrying control code to implement the methods of any of the previous aspects.

According to an aspect of the disclosure, there is provided an apparatus arranged to perform the method of any of the previously defined aspects.

Although a few preferred embodiments of the present disclosure have been shown and described, it will be appreciated by those skilled in the art that various changes and modifications might be made without departing from the scope of the disclosure, as defined in the appended claims.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a better understanding of the disclosure, and to show how embodiments of the same may be carried into effect, reference will now be made, by way of example only, to the accompanying diagrammatic drawings in which:

FIG. 1 shows a table related to PDSCH layers in DMRS group according to an embodiment of the present disclosure;

FIG. 2 shows a table related to PDSCH EPRE to PTRS EPRE per layer per RE for PTRS port i ($\alpha_{PTRS,i}$) according to an embodiment of the present disclosure;

FIG. 7 shows a table related to PDSCH EPRE to PTRS EPRE per layer per RE for PTRS port i when two DMRS port groups are scheduled ($\gamma_{PTRS,i}$) according to an embodiment of the present disclosure;

FIG. 8 shows a table related to PDSCH EPRE to PTRS EPRE per layer per RE for PTRS port i when two DMRS port groups are scheduled ($\alpha_{PTRS,i}$) according to an embodiment of the present disclosure;

FIGS. 9 to 14 show a table related to PDSCH EPRE to PTRS EPRE per layer per RE for PTRS port i when two DMRS port groups are scheduled ($\alpha_{PTRS,i}$) for different values of m according to an embodiment of the present disclosure; and FIG. 15 shows a table related to power boosting in the UL according to an embodiment of the present disclosure.

DETAILED DESCRIPTION

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the disclosure deal with power boosting issue for PTRS in downlink (DL) transmission. The equation below shows that power boosting can be divided into two parts:

$$\rho_{PTRS,i} = -10 \log_{10}(N_{PTRS}) - \alpha_{PTRS,i}.$$

Figure 3:
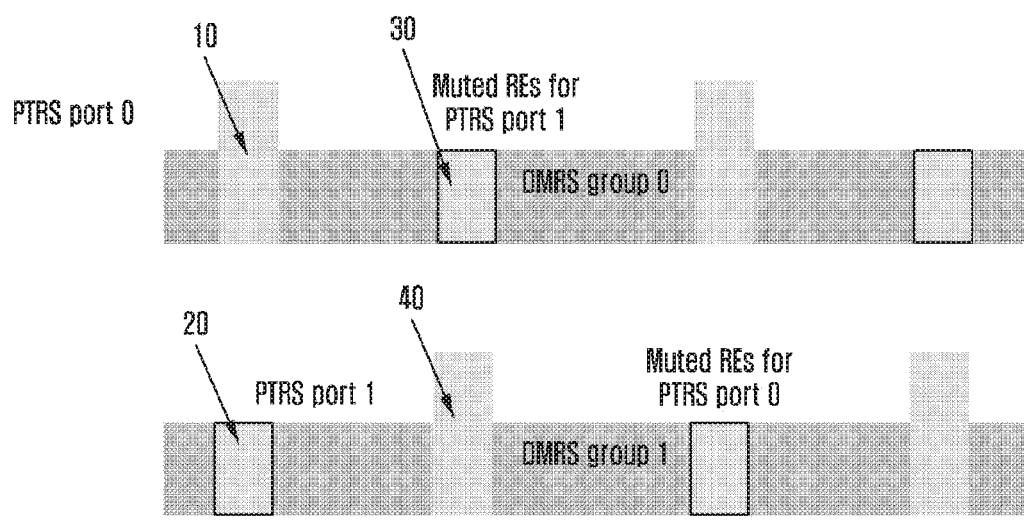
FIG. 3 shows a representation of power boosting by borrowing power from muted REs according to an embodiment of the present disclosure.

The first term means that when multiple PTRS ports are configured to a UE, each associated with one DMRS port group, the power from the muted resource elements (REs) because of the orthogonal multiplexing of PTRS ports and PTRS port and data can be effectively borrowed for power boosting as shown in FIG. 3. This figure shows two DMRS groups —0 and 1—each having two associated PTRS ports, since there are two related oscillators.

When PTRS Port 0 (10) is transmitted on DMRS group 0, the corresponding PTRS port 0 (20) on DMRS group 1 can be muted, allowing PTRS port 0 (10) on DMRS group 0 to "borrow" some power to boost signals, as represented by the larger height of the column 10 in FIG. 3.

Similarly, when PTRS Port 1 (40) on DMRS group 1 is transmitting, PTRS port 1 (30) on DMRS group 0 is muted, allowing PTRS port 1 (40) to "borrow" some power to boost signals.

Figure 4:
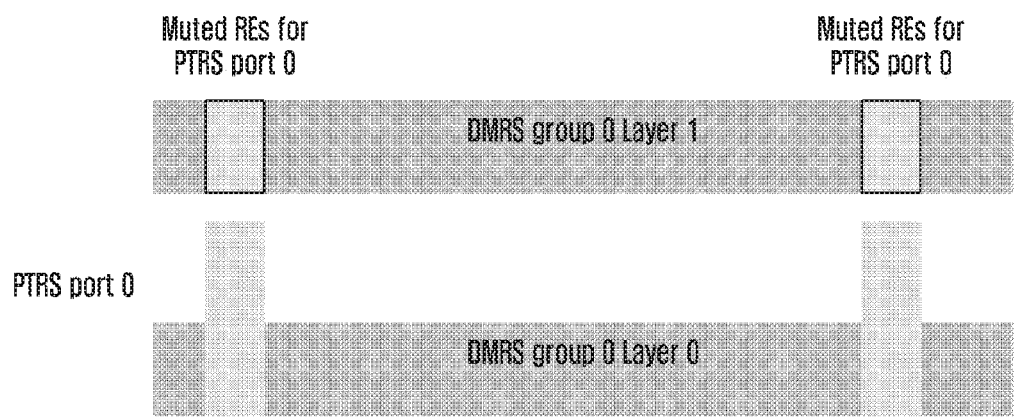
FIG. 4 shows a representation of power boosting across multiple layers according to an embodiment of the disclosure.

The second term in the above equation means that within one DMRS group associated with one PTRS port, power can be borrowed across layers to boost PTRS port power as shown FIG. 4.

This shows 2 layers —0 and 1—in a single DMRS group with a single PTRS port. Here, muting the PTRS port in one layer, enables the power in the corresponding PTRS port in the other layer to be boosted.

The power boosting mechanism can be successfully applied in the case where one PRTS port and one DMRS port group are configured and the PTRS port is associated to this DMRS port group. It can also be applied to the case where two PTRS ports and two DMRS port groups are configured and each PTRS port is associated with a different DMRS port group. In effect, one PTRS port can only be associated with one DMRS group.

Figure 5:
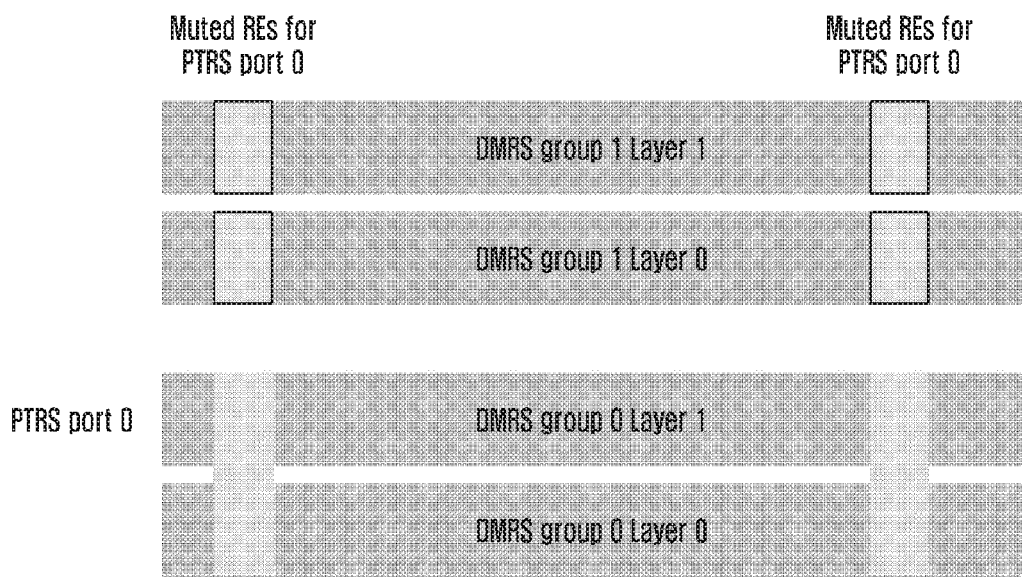
FIG. 5 shows Power boosting for one PTRS with two DMRS groups (3 dB boosting) according to an embodiment of the present disclosure.

However, in future systems, it has been agreed that one PTRS port can be transmitted for two scheduled DL DMRS port groups, and this PTRS port can be shared by two DMRS port groups because this PTRS port and the DMRS port(s) which are not in the associated DMRS port group are QCLed with respect to Doppler spread and Doppler shift. In such a case, the first term in the equation above is 0 and the power boosting is always derived from cross layer power borrowing as shown in FIG. 4. In such a case, PTRS power is only boosted based on the number of PDSCH layers within the DMRS port group containing DMRS port associated with the PTRS port as shown in FIG. 5. Here PTRS is boosted by 3 dB only and the power for the muted REs in DMRS group 1 is wasted.

Figure 6:
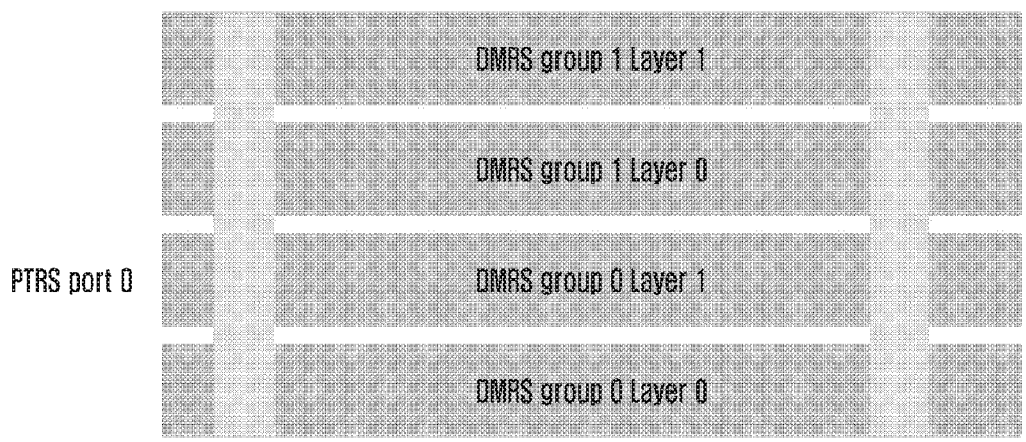
FIG. 6 shows Power boosting for one PTRS with two DMRS groups (6 dB boosting) according to an embodiment of the present disclosure.

However, if two DMRS groups can share the same power source, cross layer power borrowing is still possible and for the same assumption in FIG. 5, PTRS port can be boosted by 6 dB as shown in FIG. 6, where the vertical columns straddling all groups and layers indicate the degree of power borrowing possible.

Embodiments of the disclosure employ one of three alternative solutions to avoid wasting the power of the muted REs in another DMRS group when one PTRS is transmitted and two DMRS groups are scheduled.

In the first alternative, when one PTRS is configured and two DMRS port groups are scheduled, power boosting is limited to the DMRS port group associated with the PTRS port. Otherwise, two PTRS ports need to be configured if two DMRS port groups are scheduled.

In the second alternative, power borrowing can be cross DMRS groups when one PTRS port is configured for two scheduled DMRS groups. Adding an additional term to the previous equation gives:

$$\rho_{PTRS,i} = -10 \log_{10}(N_{PTRS}) - \alpha_{PTRS,i} - \gamma_{PTRS,i}$$

where $\gamma_{PTRS,i}$ is shown in the table of FIG. 7. The third term $\gamma_{PTRS,i}$ is only added under the condition that one PTRS port is configured and two DMRS port groups are scheduled.

In the third alternative, power borrowing can be cross DMRS groups when one PTRS port is configured for two scheduled DMRS groups. This requires a revision of $\alpha_{PTRS,i}$ and the table of FIG. 8, where m is the number of PDSCH layers not within the DMRS port group containing DMRS port associated with the PTRS port i. Here the total number of PDSCH layers in two scheduled DMRS groups is reflected in third row of the table. It may be noted that the third row is only used when one PTRS port is configured for two scheduled DMRS groups.

As a further alternative, it is possible to apply multiple tables based on m under the condition that one PTRS port is configured and two DMRS port groups are scheduled. FIGS. 9 to 14 show the different tables to be applied for values of m between 1 and 6 respectively. These tables are indexed by m, representing the number of PDSCH layers, as shown upper left, in each case.

In another embodiment of the present disclosure, when one UL PTRS port is transmitted, PUSCH to PTRS power ratio per layer per resource element (RE)=−A, where A is given by the table shown in FIG. 15 using the RRC parameter, UL-PTRS-EPRE-ratio, with default value of 00.

Since sharing the same power source is always possible at the UE, the same table can be used when two PTRS ports are configured as well.

The previous embodiments were concerned with DL power boost, but there is no reason why the same rationale cannot be applied to UL transmissions. Here, the UE may use 2 panels, each one using the same power source and embodiments make use of the inventive concept that 2 PTRS ports can be configured using the same table (as shown in FIG. 15) for each of the PTRS ports. Embodiments of the disclosure may be further configured to use more than 2 PTRS ports as required, with each using the same table.

Another embodiment deals with an issue concerning constraints on the ability to "borrow" power. If there is a constraint on per antenna/antenna port power, because RF chain cost is higher without such a constraint, power boosting may be adjusted to include such constraint.

For instance, certain types of equipment, referred to here as "low-cost," it may not be possible to boost power on the basis of "borrowed" power from a muted RE. This would typically apply to the UE, but base stations could also be so affected.

For UL codebook-based partial coherent or non-coherent transmissions, there have been discussions regarding how to apply per antenna/antenna port constraints. However, there are currently certain configurations or scenarios which have not been resolved.

Firstly, the same principle may also applied be to DL codebook-based partial or non-coherent transmission if the cost of the access point is limited.

Secondly, for non-codebook based transmission, the same per antenna/antenna port power constraint may apply. If the per antenna/antenna port power constraint is $\gamma_i$ for antenna/antenna port i and power boosting factor without constraint is $\beta$, the power boosting factor may be scaled by $\gamma_i/\beta$ subject to the per antenna/antenna port power constraint.

Thirdly, such per antenna/antenna port power constraint depends on UE or base station (e.g., gNB, eNB, NodeB) capability. If the UE or gNB has a high cost RF chain and such constraint may not be applied, power boosting may follow the original agreements as it increases the SINR of PTRS, which could potentially be used for channel estimation. Whether or not to adopt a per antenna/antenna port power constraint may be one of the UE or gNB features, determined as required. From the UE side, it may be included in a UE capability report or other explicit form of UE feedback. From the gNB side, it may be indicated to the UE using DCI, MAC CE, RRC or other form of downlink signaling, explicitly.

Two alternatives to handle such constraint form embodiments of the present disclosure.

In the first alternative, by default, there is no per antenna/antenna port constraint and the original power boosting mechanism is applied. For UL, if the UE reports in the form of a UE capability report or other form of UE feedback to adopt per antenna/antenna port power constraint explicitly, the gNB expects that such constraint is applied and may adjust following procedure accordingly, if necessary. For DL, if the gNB signals to adopt per antenna/antenna port power constraint explicitly, the UE expects that such constraint is applied and may adjust following procedure accordingly, if necessary.

In the second alternative, there is no default mode. For UL, the UE always reports (or signals in some other form of UE feedback) that per antenna/antenna port power constraint is adopted. For DL, the gNB always reports, (using DCI, MAC CE, RRC or other form of signaling) to indicate to the UE that per antenna/antenna port power constraint is adopted.

The prior embodiments refer to PTRS as the reference signal, but the same principles apply to other reference signals, such as CSI-RS, DMRS, SRS and TRS where power boosting may be employed when necessary. The embodiments which refer to PTRS are to be considered as exemplary only and the skilled person will understand that benefits may be derived by applying the techniques of the present disclosure to other reference signals in a telecommunication system, as desired.

For DMRS, it has been agreed in the standardization process that DMRS port can be power boosted. The power boosting per antenna/antenna port limit may also apply to DMRS antenna port and in such a case, the two alternative solutions mentioned previously may also be applied to DMRS. For other Reference Signals, power boosting is still under active discussion but if it is agreed, per antenna/antenna port limits as described herein may also be applied.

At least some of the example embodiments described herein may be constructed, partially or wholly, using dedicated special-purpose hardware. Terms such as "component," "module" or "unit" used herein may include, but are not limited to, a hardware device, such as circuitry in the form of discrete or integrated components, a field programmable gate array (FPGA) or application specific integrated circuit (ASIC), which performs certain tasks or provides the associated functionality. In some embodiments, the described elements may be configured to reside on a tangible, persistent, addressable storage medium and may be configured to execute on one or more processors.

These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The present disclosure is not restricted to the details of the foregoing embodiment(s). The present disclosure extends to any novel one, or any novel combination, of the features disclosed in this specification (including any accompanying claims, abstract and drawings), or to any novel one, or any novel combination, of the steps of any method or process so disclosed.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a terminal, the method comprising:
receiving, from a base station, information related to power of an uplink phase tracking reference signal (PTRS);
identifying a factor related to a physical uplink shared channel (PUSCH) to PTRS power ratio per layer per resource element (RE) based on the information, a number of PUSCH layers, and a type of an uplink transmission; and
transmitting, to the base station, the uplink PTRS based on the factor,
wherein the factor related to the PUSCH to PTRS power ratio per layer per RE is identified based on information associated with an uplink PTRS port, in case the type of the uplink transmission is one of a codebook-based partial coherent transmission, a codebook-based non-coherent transmission, and a non-codebook based transmission, and
wherein the number of PUSCH layers is identified based on both of a number of PUSCH layers within a demodulation reference signal (DMRS) port group containing a DMRS port associated with the uplink PTRS port and a number of PUSCH layers not within the DMRS port group containing the DMRS port associated with the uplink PTRS port.

2. The method of claim 1, wherein, in case the type of the uplink transmission is not the codebook-based partial coherent transmission, the codebook-based non-coherent transmission or the non-codebook based transmission:
the factor is set to 3 based on the information set to 00 and the number of PUSCH layers set to 2;
the factor is set to 4.77 based on the information set to 00 and the number of PUSCH layers set to 3;
the factor is set to 6 based on the information set to 00 and the number of PUSCH layers set to 4; and
the factor is set to 0 based on the information set to 00 and the number of PUSCH layers set to 1.

3. The method of claim 1, wherein the factor identified is used in case that one or two uplink PTRS ports are configured to the terminal.

4. The method of claim 1, wherein the information related to power of the uplink PTRS is received on a radio resource control (RRC) signaling.

5. The method of claim 1, wherein the type of the uplink transmission is determined based on a capability of the terminal transmitted from the terminal to the base station.

6. The method of claim 1, wherein the uplink PTRS port is quasi co-located with demodulation reference signal (DMRS) ports within a DMRS port group containing DMRS port associated with the uplink PTRS port, with respect to delay spread, Doppler spread, Doppler shift, average delay and spatial Rx parameter.

7. The method of claim 6, the uplink PTRS port is quasi co-located with DMRS ports not within the DMRS port group containing the DMRS port associated with the uplink PTRS port, with respect to Doppler spread and Doppler shift.

8. The method of claim 1, further comprising: transmitting, to the base station, information indicating whether a power constraint per PTRS port is adopted, and
wherein the factor is scaled based on a ratio corresponding to each of the PTRS port, in case that the information indicates the power constraint per PTRS port is adopted.

9. A method of a base station, the method comprising:
transmitting, to a terminal, information related to power of an uplink phase tracking reference signal (PTRS); and
receiving, from the terminal, the uplink PTRS based on a factor,
wherein a factor related to a physical uplink shared channel (PUSCH) to PTRS power ratio per layer per resource element (RE) is identified based on the information, a number of PUSCH layers, and a type of an uplink transmission,
wherein the factor related to the PUSCH to PTRS power ratio per layer per RE is identified based on information associated with an uplink PTRS port, in case the type of the uplink transmission is one of a codebook-based partial coherent transmission, a codebook-based non-coherent transmission, and a non-codebook based transmission, and
wherein the number of PUSCH layers is identified based on both of a number of PUSCH layers within a demodulation reference signal (DMRS) port group containing a DMRS port associated with the uplink PTRS port and a number of PUSCH layers not within the DMRS port group containing the DMRS port associated with the uplink PTRS port.

10. The method of claim 9, wherein, in case the type of the uplink transmission is not the codebook-based partial coherent transmission, the codebook-based non-coherent transmission or the non-codebook based transmission:
the factor is set to 3 based on the information set to 00 and the number of PUSCH layers set to 2;
the factor is set to 4.77 based on the information set to 00 and the number of PUSCH layers set to 3;
the factor is set to 6 based on the information set to 00 and the number of PUSCH layers set to 4; and
the factor is set to 0 based on the information set to 00 and the number of PUSCH layers set to 1.

11. The method of claim 9, wherein the factor identified is used to receive the uplink PTRS and data in case that one or two uplink PTRS ports are configured to the terminal.

12. The method of claim 9, wherein the information related to power of the uplink PTRS is transmitted on a radio resource control (RRC) signaling.

13. A terminal, the terminal comprising:
a transceiver; and
a controller operably connected to the transceiver, the transceiver configured to:
receive, from a base station, information related to power of an uplink phase tracking reference signal (PTRS),
identify a factor related to a physical uplink shared channel (PUSCH) to PTRS power ratio per layer per resource element (RE) based on the information, a number of PUSCH layers, and a type of an uplink transmission, and
transmit, to the base station, the uplink PTRS based on the factor,
wherein the factor related to the PUSCH to PTRS power ratio per layer per RE is identified based on information associated with an uplink PTRS port in case the type of the uplink transmission is one of a codebook-based partial coherent transmission, a codebook-based non-coherent transmission, and a non-codebook based transmission, and wherein the number of PUSCH layers is identified based on both of a number of PUSCH layers within a demodulation reference signal (DMRS) port group containing a DMRS port associated with the uplink PTRS port and a number of PUSCH layers not within the DMRS port group containing the DMRS port associated with the uplink PTRS port.

14. The terminal of claim 13, wherein, in case the type of the uplink transmission is not the codebook-based partial coherent transmission, the codebook-based non-coherent transmission or the non-codebook based transmission:

the factor is set to 3 based on the information set to 00 and the number of PUSCH layers set to 2;

the factor is set to 4.77 based on the information set to 00 and the number of PUSCH layers set to 3;

the factor is set to 6 based on the information set to 00 and the number of PUSCH layers set to 4; and wherein the factor is set to 0 based on the information set to 00 and the number of PUSCH layers set to 1.

15. The terminal of claim 13, wherein the factor identified is used in case that one or two uplink PTRS ports are configured to the terminal.

16. The terminal of claim 13, wherein the information related to power of the uplink PTRS power is received on a radio resource control (RRC) signaling.

17. A base station, the base station comprising:

a transceiver; and a controller operably connected to the transceiver, the controller configured to:

transmit, to a terminal, information related to power of an uplink phase tracking reference signal (PTRS), and receive, from the terminal, the uplink PTRS based on a factor, wherein a factor related to a physical uplink shared channel (PUSCH) to PTRS power ratio per layer per resource element (RE) is identified based on the information, a number of PUSCH layers, and a type of an uplink transmission, wherein the factor related to the PUSCH to PTRS power ratio per layer per RE is identified based on information associated with an uplink PTRS port, in case the type of the uplink transmission is one of a codebook-based partial coherent transmission, a codebook-based non-coherent transmission, and a non-codebook based transmission, and wherein the number of PUSCH layers is identified based on both of a number of PUSCH layers within a demodulation reference signal (DMRS) port group containing a DMRS port associated with the uplink PTRS port and a number of PUSCH layers not within the DMRS port group containing the DMRS port associated with the uplink PTRS port.

18. The base station of claim 17, wherein, in case the type of the uplink transmission not being the codebook-based partial coherent transmission, the codebook-based non-coherent transmission or the non-codebook based transmission:

the factor is set to 3 based on the information set to 00 and the number of PUSCH layers set to 2;

the factor is set to 4.77 based on the information set to 00 and the number of PUSCH layers set to 3;

the factor is set to 6 based on the information set to 00 and the number of PUSCH layers set to 4; and the factor is set to 0 based on the information set to 00 and the number of PUSCH layers set to 1.

19. The base station of claim 17, wherein the factor identified is used to receive the uplink PTRS and data in case that one or two uplink PTRS ports are configured to the terminal, and wherein the information related to power of the uplink PTRS is transmitted on a radio resource control (RRC) signalling.

* * * * *

UNITED STATES PATENT AND TRADEMARK OFFICE
CERTIFICATE OF CORRECTION

| | | |
|---|---|---|
| PATENT NO. | : 11,115,932 B2 | Page 1 of 1 |
| APPLICATION NO. | : 16/278597 | |
| DATED | : September 7, 2021 | |
| INVENTOR(S) | : Yinan Qi | |

It is certified that error appears in the above-identified patent and that said Letters Patent is hereby corrected as shown below:

On the Title Page

Column 1, Item (30), Line 1, "1802576" should read --1802576.7--.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*